United States Patent
Banerjee et al.

(10) Patent No.: US 12,468,756 B2
(45) Date of Patent: Nov. 11, 2025

(54) QUERY EVALUATION FOR IMAGE RETRIEVAL AND CONDITIONAL IMAGE GENERATION

(71) Applicant: Amazon Technologies, Inc., Seattle, WA (US)

(72) Inventors: Pratyay Banerjee, San Jose, CA (US); Ojas Yashwant Joshi, Redwood City, CA (US); Amita Misra, San Jose, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 18/615,096

(22) Filed: Mar. 25, 2024

(65) Prior Publication Data
US 2025/0298839 A1    Sep. 25, 2025

(51) Int. Cl.
*G06F 16/53*    (2019.01)
*G06F 16/51*    (2019.01)
*G06F 16/532*    (2019.01)
*G06F 40/295*    (2020.01)

(52) U.S. Cl.
CPC ............ *G06F 16/532* (2019.01); *G06F 16/51* (2019.01); *G06F 40/295* (2020.01)

(58) Field of Classification Search
CPC ....... G06F 16/532; G06F 16/51; G06F 40/295
See application file for complete search history.

(56) References Cited

U.S. PATENT DOCUMENTS

| | | | |
|---|---|---|---|
| 10,552,541 B1 * | 2/2020 | Dreher | G06N 5/02 |
| 12,229,192 B2 * | 2/2025 | Lott | G06F 16/9027 |
| 2006/0053000 A1 * | 3/2006 | Moldovan | G06F 40/30 |
| | | | 704/9 |
| 2023/0161808 A1 * | 5/2023 | Bursztyn | G06F 16/53 |
| | | | 707/772 |
| 2024/0251178 A1 * | 7/2024 | Basu | H04N 23/957 |

OTHER PUBLICATIONS

Budaraju, Hema; New ways to get inspired 1-15 with generative AI in Search; Google Blog; Oct. 12, 2023; 5 pgs.
Rameseder, Jonathan; International Search Report and Written Opinion of PCT/US2025/020160; Jun. 5, 2025; 3 pgs.

* cited by examiner

*Primary Examiner* — Loc Tran
(74) *Attorney, Agent, or Firm* — K&L Gates LLP

(57) ABSTRACT

Techniques are generally described for query evaluation for image retrieval and image generation. In various examples, a first encoded representation of first natural language input data may be generated. An image retrieval process may be selected from among the image retrieval process and an image generation process based at least in part on the first encoded representation of the first natural language input data. A second natural language encoder may generate a second encoded representation of the first natural language input data. The second encoded representation may be used to determine first image data stored in a first data repository. The first image data may be sent for output on a display of a first computing device.

20 Claims, 6 Drawing Sheets

QUERY EVALUATION FOR IMAGE RETRIEVAL AND CONDITIONAL IMAGE GENERATION

BACKGROUND

People can interact with computing devices using spoken commands and/or other natural language inputs. In some systems, a "wakeword" is used to activate functionality. Natural language processing may be used to transform the natural language requests that follow into a computer directive for performing a task. In some cases, computing devices may include and/or be associated with displays that can display images and/or video to enhance the user experience.

DETAILED DESCRIPTION

Figure 1:
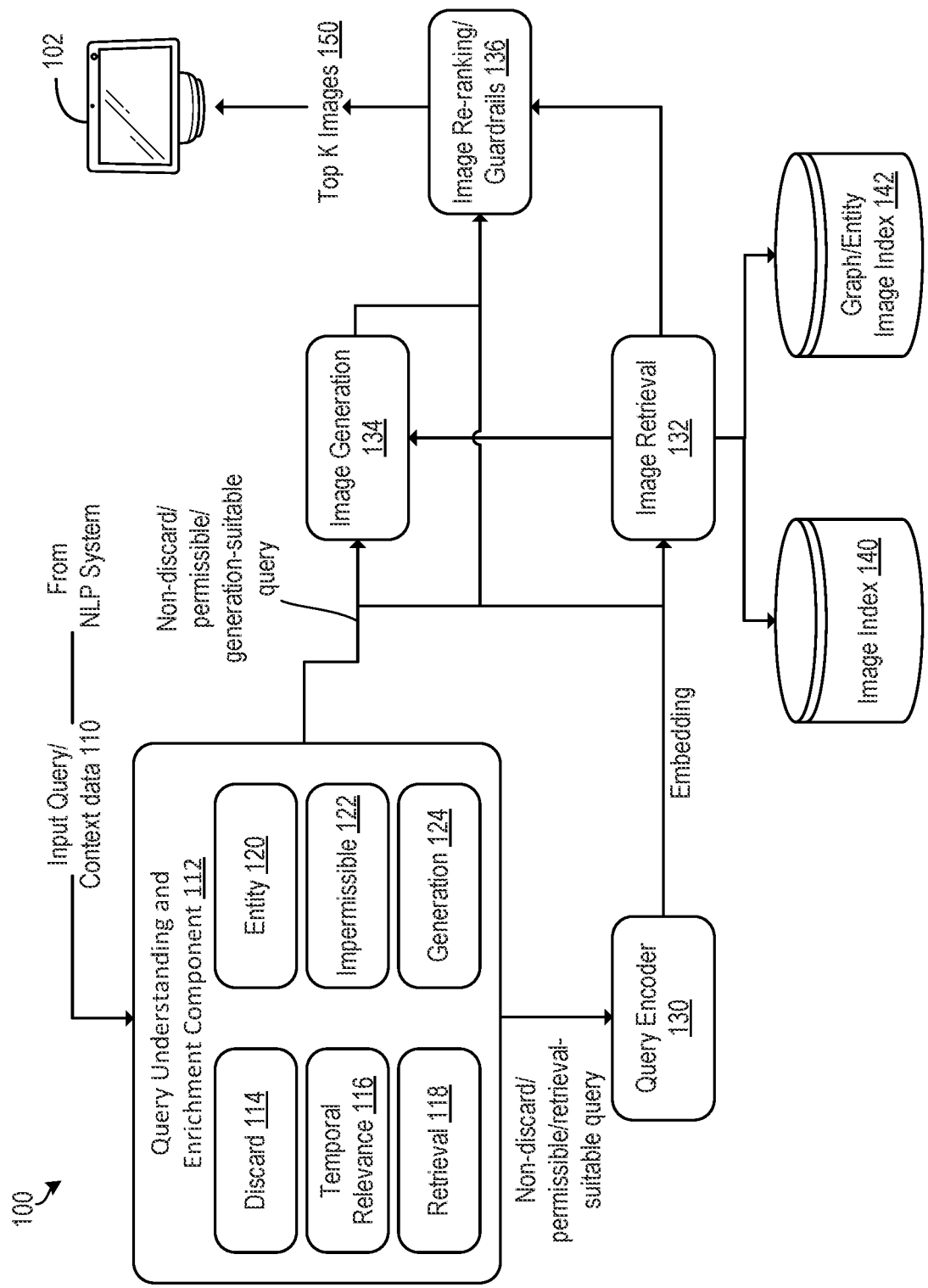
FIG. 1 illustrates an example system effective to provide query evaluation for image retrieval and conditional image generation, in accordance with various aspects of the present disclosure.

In the following description, reference is made to the accompanying drawings that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

Devices with integrated processing capabilities are often configured with network communication capability and/or other computing functions allowing the devices to send data to and/or receive data from other devices. In some examples, such devices may include voice-enabled personal assistants, such as computer-implemented conversational agents, and/or other natural language processing interfaces that may be used to control the devices, answer questions, communicate with other people/devices, and/or otherwise interact with the devices and/or other devices. As such devices become more and more prevalent in both the home, office, public spaces (e.g., retail spaces, public transportation), quasi-public spaces (e.g., hotels, offices, etc.), and elsewhere generally, and as the technology matures, new services and features are being developed. For instance, in some cases devices may be paired or otherwise grouped together with one another to enable certain functionality. For example, a device that includes voice-based personal assistant functionality may be paired with a device including a display so that spoken commands may be used to control content output by the display device. In another example, content may be transferred from one device to another device in response to user requests and/or other triggering events (e.g., If This Then That (IFTTT) recipes, presence information, etc.).

In some cases, a user may make a request of a voice-enabled personal assistant executing on a device. Requests may include requests to answer questions, play content (e.g., music, video, audiobooks), display images, etc. In some cases, it may be advantageous to display content that is related to an input request (even if the input request is not a request that is specifically related to showing an image or video). For example, a user may ask the question, "Where is the Golden Gate bridge?" In response, the voice-enabled personal assistant may use natural language processing to output a text and/or audio response indicating that the Golden Gate bridge is located in San Francisco, California. In addition, in order to enhance the user experience, the voice-enabled personal assistant may retrieve an image of the Golden Gate bridge (using image retrieval techniques described in further detail below) for display while answering the question. In some contexts, a user may ask a question for which there may be no existing relevant image stored in a repository to which the voice-enabled personal assistant has access and/or for which a generative model may be well-suited to generate a high-quality image/video. For example, a user may input the request "show me an image of a rainbow in the desert." The particular repositor(ies) to which the virtual-assistant has access may not have an image that is determined to be related to this input request. Accordingly, the input request may be input into a generative model (together with any grounding data and/or contextual data) so that the generative model may generate an image related to the input request.

In some cases, artificial intelligence (AI) based image generation may not be appropriate to use for a particular input request. For example, if a user request is related to a particular recognized entity (such as a prominent public figure, celebrity, real person, business, etc.), image generation may not be appropriate in order to avoid potential generative model hallucinations, misrepresentations, and/or the possible portrayal of the recognized entity in an unpredictable, unfavorable, misleading, and/or other potentially undesirable manner. In other examples, AI image generation may not be appropriate for other types of natural language requests, such as for error messages.

In some cases, image retrieval (e.g., query embedding-based image retrieval) may also not be appropriate for certain types of inputs/requests. For example, if a user asks a question that the voice-enabled personal assistant is unable to answer and/or an error occurs, the voice-enabled personal assistant may output an error message and/or apology such as "I'm sorry, I don't know the answer." This may be the type of system response that is inappropriate for image display. Accordingly, this natural language statement may not be used for either image retrieval or image generation. Similarly, a user may (knowingly or unknowingly) request that impermissible content be displayed (e.g., content that violates one or more guardrails, policies, legal requirements, etc.). In such a case, it is important that no images be retrieved and that the user's request not be input into a generative model.

In still other examples, an improved user experience may be offered if the context of the user input or the system response is considered and accounted for during either image generation or image retrieval. For example, if a user asks the question, "what team won the championship in

[Sports league] in 1993," the image retrieval task should consider the temporal information included in the question in order to display an image that is responsive to the user's question.

Described herein are systems and techniques for query evaluation for image retrieval and conditional image generation. In some examples, a query understanding and enrichment component is described. The query understanding an enrichment component may use machine learning-based models and/or techniques to evaluate natural language input data in order to select between image retrieval processing, image generation processing, neither, or both. Additionally, for image retrieval tasks, the query understanding and enrichment component may determine whether a recognized entity is present in the natural language input data. If so, entity-based retrieval (which may incur less latency and/or be less compute intensive) may be used to retrieve one or more images related to the recognized entity instead of using a more general text-based image retrieval processing workflow (which may use more compute resources and/or incur more latency). In still other examples, the query understanding and enrichment component may determine that certain types of natural language inputs are not appropriate for either image generation or retrieval. In further examples, the query understanding and enrichment component may determine that certain input queries should be rewritten and/or enriched (e.g., with contextual data) prior to performing one or more of image retrieval processing and/or image generation processing.

As used herein, the "input" data or query that is input into the query understanding and enrichment component may refer to any type of natural language input data that is being considered for either image retrieval processing, image generation processing, neither, or both. For example, the input may be a user request (e.g., text of a spoken user utterance transcribed using automatic speech recognition (ASR) and/or user-input text), such as "Show me a picture of a blue whale." In some examples, the input may be a re-written or enhanced version of the user request. For example, for the user input "show me a picture of a blue whale" a language model may rewrite the query as "color photograph of blue whale." In other examples, the input may be enhanced by including contextual data/information with the query (e.g., previous user statements/system responses in a dialog, location information, etc.).

Currently, there is no way of automatically determining for a given input, whether image retrieval processing, image generation processing, both, or neither would be most appropriate given the content and context of the particular input. The systems and techniques described herein overcome this technical challenge using computer-implemented artificial intelligence-based processing techniques to select the appropriate image generation/retrieval techniques by evaluating and classifying (using supervised machine learning based encoders and/or classifiers) the input data and selecting the appropriate downstream image generation/retrieval processing pipelines to augment the user experience and output highly contextually-relevant images. In addition, the query understanding and enrichment components described herein are configured to minimize latency and compute requirements during image generation/retrieval processing.

Machine learning (ML) and/or artificial intelligence (AI) techniques, such as those described herein, are often used to form predictions, solve problems, recognize objects in image data for classification, generate images, etc. For example, ML techniques may be used to detect objects represented in image data and/or translate text from one spoken language to another. In various examples, ML models may perform better than rule-based systems and may be more adaptable as ML models may be improved over time by retraining the models as more and more data becomes available. Accordingly, ML techniques are often adaptive to changing conditions. Deep learning algorithms, such as neural networks, are often used to detect patterns in data and/or perform tasks.

Generally, in ML or AI models, such as neural networks, parameters control activations in neurons (or nodes) within layers of the ML models. The weighted sum of activations of each neuron in a preceding layer may be input to an activation function (e.g., a sigmoid function, a rectified linear units (ReLU) function, etc.). The result determines the activation of a neuron in a subsequent layer. In addition, a bias value can be used to shift the output of the activation function to the left or right on the x-axis and thus may bias a neuron toward activation.

Generally, in ML or AI models, such as neural networks, after initialization, annotated training data may be used to generate a cost or "loss" function that describes the difference between expected output of the ML model and actual output. The parameters (e.g., weights and/or biases) of the ML model may be updated to minimize (or maximize) the cost. For example, the ML model may use a gradient descent (or ascent) algorithm to incrementally adjust the weights to cause the most rapid decrease (or increase) to the output of the loss function. The method of updating the parameters of the ML model is often referred to as back propagation.

Various examples described herein may use latent diffusion, a technique built generative artificial intelligence (GAI). The latent diffusion techniques may include text-to-image and in some cases may use other images (e.g., retrieved images) as contextual input (along with input text).

Latent Diffusion

Latent diffusion models are generative models that may be trained to generate data similar to the data on which they are trained. Latent diffusion models work by injecting Gaussian noise into training data and learning to recover the original training data by reversing the noising process. More specifically, a latent diffusion model is a latent variable model that maps inputs to the latent space using a fixed Markov chain. The Markov chain gradually adds more noise until the input is asymptotically transformed into pure Gaussian noise. The goal of training the latent diffusion model is the reverse process—in order to be able to generate data of interest from noisy input. Latent diffusion models may outperform and/or offer advantages over other image generative ML techniques (notably adversarial networks).

Diffusion models are generative models that learn the data distribution by reversing a fixed-length Markovian forward process, thereby iteratively denoising a normally distributed variable. In some cases, instead of using the pixel space, denoising can be conducted in a latent space, which is computationally efficient as it reduces the dimension of images. Additionally, use of the latent space omits the high frequency noise within the given image. One example of a latent diffusion models is Stable Diffusion, which includes three main components: A Variational Autoencoder (VAE) to transform the given input in a latent space, a text encoder to process the given text on which image generation is conditioned, and a time-conditioned UNet to predict the noise that is added on the image latents which is conditioned by the text embeddings. Mathematically, the conditioned latent diffusion model can be learned by optimizing the following loss:

$$L_{LDM} = \mathbb{E}_{\varepsilon(x), c, \in, t}[\|\in_\theta(z_t, t, c) - \in\|_2^2] \quad (1)$$

where, $z_t$ is the latent version of the input $x_t$ provided by the VAE as $z=\varepsilon(x)$. $x_t$ is the noise added version of the input x, at a timestep of t, where $x = \alpha_t x_0 + (1-\alpha_t)\in$ and $\alpha_t$ decreases with the timestamp t. Noise is denoted by $\in \sim \mathcal{N}(0,1)$. $\in_\theta$ is the UNet. Lastly, c denotes the conditioning variable, and for the text guided models, it is given by processing the given text with the CLIP text encoder.

Operationally, a latent diffusion model may have a text-to-image mode that accepts a text prompt and produces an image. In some examples, the contrastive language-image pretraining (CLIP) text encoder (or other text encoder) may be used in some examples to decode a text string and produce tokens that may be mapped to the latent space of the latent diffusion model. Latent diffusion models may also operate in an image-to-image mode that accepts an image prompt and, optionally, a text prompt. Image-to-image mode uses the same overall architecture as the latent diffusion models described above, but differs in how the image and/or text prompts are mapped to the latent space of the latent diffusion model. The latent diffusion model may include an image encoder that is trained to map images into the latent space. The images in the latent space are then iteratively evolved through the diffusion process as in other latent diffusion applications.

Some latent diffusion models include network structures that are configured to control the diffusion model by incorporating extra conditions. For example, image input may be provided in addition to text and/or image prompt that provides guidelines, segmentation, constraints, conditions, or the like for image generation. Network architectures may be augmented by creating a trainable copy of the encoding layers of the base model, using the original pre-trained model as a backbone for learning conditional controls.

In various examples, latent diffusion models and/or other image generation models may be used to generate images in response to natural language input data, as described herein.

Language Models

Some natural language processing flows may employ one or more language models (LMs) in order to process natural language requests. A generative LM is an artificial intelligence (AI) model that may be capable of processing and generating human-like text based on the latent information it has learned from vast amounts of training data. In some cases, some LMs are referred to as "large" language models (LLMs). The term "large" refers to the size of these models in terms of the number of parameters or weights, which are the values that the model learns during training to make predictions and/or generate output such as text, synthesized speech, control instructions for control of other devices, etc. LMs may have millions, billions (or even more) parameters, which enable such models to capture complex patterns and nuances in language that, in turn, allow the models to process and generate more natural-sounding text (relative to previous approaches). LMs are typically trained on massive datasets that include a wide variety of text from various sources, enabling the LMs to "understand" grammar, context, and the relationships between words, sentences, paragraphs, etc. Examples of LMs include the generative pre-trained transformer models (e.g., GPT-3, GPT-4), Pathways Language Model (PaLM), Large Language Model Meta Artificial Intelligence (LLaMA), as well as non-generative examples such as BERT (bidirectional encoder representations from Transformers), etc.

In a generative context, an LM may generate text that is responsive to the input prompt provided to the LM. LMs excel at generating natural sounding text that appears as though it has been generated by a native speaker in the relevant language. In addition to fluency, generative LMs are able to generate detailed, relevant, and largely accurate responses to input prompts in many cases due to the large amount of latent information the generative LM has learned during training. The term "prompt" may refer to plain text or structured text, and may be provided via an interface to the LM, such as an API. The prompt may generally be written in natural language, expressed, for example, as if requesting a task to be performed by the LM (e.g., "Who is the current President of the United States?").

In various examples described herein, LM-based natural language processing may generate prompt data for a given input request (e.g., a text transcription of a given spoken request, generated using automatic speech recognition (ASR)). The prompt data may be augmented with various context data (a process sometimes referred to as "grounding") and may be input into the LM. For example, a user may request "What is the best restaurant located nearest to the tallest mountain in California?" The prompt data generated for this request may instruct the LM to break the request down into a number of sub-tasks for solving the problem. The prompt data may also include various other context such as a device ID of a device used to input the request, time of day, day of year, account ID, previous turns in a current dialog session, etc.

Automatic speech recognition (ASR) is a field of computer science, artificial intelligence, and linguistics concerned with transforming audio data associated with speech into text data and/or other ASR output data representative of that speech. In a voice assistant context, such as those described herein, ASR may be used to transform spoken utterances into text that can then serve as the input to an LLM or other language model (e.g., natural language understanding (NLU), which is a field of computer science, artificial intelligence, and linguistics concerned with enabling computers to derive meaning from text input containing natural language, resulting in specific executable command data (e.g., intent data) or other type of instructions). Text-to-speech (TTS) is a field of computer science, artificial intelligence, and linguistics concerned with enabling computers to output synthesized speech. ASR, generative language models (e.g., such as some LLMs), and TTS may be used together as part of a natural language processing system. As used in, natural language input data may comprise audio data (e.g., representing a user request or command), text data, and/or other representation data representing natural language for input into a natural language processing system.

The various techniques described herein may be used in a variety of contexts, including in natural language processing enabled devices (e.g., devices employing voice control and/or speech processing "voice assistants") and/or systems. Examples of speech processing systems and/or voice-enabled personal assistants include the Siri system from Apple Inc. of Cupertino, California, voice-enabled actions invoked by the Bard assistant or the Google Assistant system from Google LLC of Mountain View, California, Dragon speech recognition software or the Copilot system from Microsoft of Redmond, Washington, the Alexa system from Amazon.com, Inc. of Seattle, Washington, etc. Other examples of smart home devices and/or systems that may use the various content-based voice targeting techniques described herein may include Google Nest Smarthome products from Google LLC, HomeKit devices from Apple Inc., various smart doorbells (e.g., with integrated cameras and/or natural language processing capability), etc. For example, some models of Ring camera-integrated doorbells include Alexa speech processing functionality to allow users to have a virtual assistant interact with people at the door to take messages, etc.

Natural language processing enabled devices may include one or more microphones (e.g., far-field microphone arrays) used to transform audio into electrical signals. Speech processing may then be performed, either locally by the speech processing enabled device, by one or more other computing devices communicating with the speech processing enabled device over a network, or by some combination of the natural language processing enabled device and the one or more other computing devices. In various examples, natural language processing enabled devices may include and/or may be configured in communication with speakers and/or displays effective to output information obtained in response to a user's spoken request or command, and/or to output content that may be of interest to one or more users.

Storage and/or use of data related to a particular person or device (e.g., device identifier data, device names, names of device groups, contextual data, and/or any personal data) may be controlled by a user using privacy controls associated with a speech processing enabled device and/or a companion application associated with a speech processing enabled device. Users may opt out of storage of personal, device state (e.g., a paused playback state, etc.), and/or contextual data and/or may select particular types of personal, device state, and/or contextual data that may be stored while preventing aggregation and storage of other types of personal, device state, and/or contextual data. Additionally, aggregation, storage, and use of personal, device state, and/or contextual information, as described herein, may be compliant with privacy controls, even if not legally subject to them. For example, personal, contextual, device state, and other data described herein may be treated as if it was subject to acts and regulations, such as the Health Insurance Portability and Accountability Act (HIPAA) and the General Data Protection Regulation (GDPR), even if it is not actually subject to these acts and regulations. In various examples, the device and/or device group names and/or any data captured by such devices may be used only in accordance with user permission, in compliance with any relevant laws and/or policies. Additionally, users may opt out of data collection, and/or may opt to delete some or all of the data used by the various techniques described herein, even where deletion or non-collection of various data may result in reduced functionality and/or performance of various aspects of the systems described herein.

In various examples, a natural language processing enabled device may include a wakeword detection component. The wakeword detection component may process audio data captured by microphones of the speech processing enabled device and may determine whether or not a keyword and/or phrase, which are collectively sometimes referred to herein as a "wakeword", is detected in the audio data. In some examples, when a wakeword is detected, the speech processing enabled device may enter a "sending mode," "audio capturing mode," and/or other type of processing mode in which audio detected by the microphones following the wakeword (e.g., data representing user request data spoken after the wakeword) may be sent to natural language processing computing component(s) (either locally or remotely) for further natural language processing (e.g., ASR, NLU, LLM inference, etc.). In various examples, the wakeword detection component may be used to distinguish between audio that is intended for the natural language processing system and audio that is not intended for the natural language processing system.

Transformer Models

Transformer models are machine learning models that include an encoder network and a decoder network. LLMs are often implemented using transformer models. The encoder takes an input (e.g., a "prompt") and generates feature representations (e.g., feature vectors, feature maps, etc.) of the input. The feature representation is then fed into a decoder that may generate an output based on the encodings. In natural language processing, transformer models take sequences of words as input. A transformer may receive a sentence and/or a paragraph (or any other quantum of text) comprising a sequence of words as an input.

The encoder network of a transformer comprises a set of encoding layers that processes the input data one layer after another. Each encoder layer generates encodings (referred to herein as "tokens"). These tokens include feature representations (e.g., feature vectors and/or maps) that include information about which parts of the input data are relevant to each other. Each encoder layer passes its token output to the next encoder layer. The decoder network takes the tokens output by the encoder network and processes them using the encoded contextual information to generate an output (e.g., the aforementioned one-dimensional vector of tokens). The output data may be used to perform task-specific functions (e.g., action plan generation for an LLM-based natural language processing flow, etc.). To encode contextual information from other inputs (e.g., combined feature representation), each encoder and decoder layer of a transformer uses an attention mechanism, which for each input, weighs the relevance of every other input and draws information from the other inputs to generate the output. Each decoder layer also has an additional attention mechanism which draws information from the outputs of previous decoders, prior to the decoder layer determining information from the encodings. Both the encoder and decoder layers have a feed-forward neural network for additional processing of the outputs, and contain residual connections and layer normalization steps.

Scaled Dot-Product Attention

The basic building blocks of the transformer are scaled dot-product attention units. When input data is passed into a transformer model, attention weights are calculated between every token simultaneously. The attention unit produces embeddings for every token in context that contain information not only about the token itself, but also a weighted combination of other relevant tokens weighted by the attention weights.

Concretely, for each attention unit the transformer model learns three weight matrices; the query weights $W_Q$, the key weights $W_K$, and the value weights $W_V$. For each token i, the input embedding $x_i$ is multiplied with each of the three weight matrices to produce a query vector $q_i = x_i W_Q$, a key vector $k_i = x_i W_K$, and a value vector $v_i = x_i W_V$. Attention weights are calculated using the query and key vectors: the attention weight $a_{ij}$ from token i to token j is the dot product between $q_i$ and $k_j$. The attention weights are divided by the square root of the dimension of the key vectors, $\sqrt{d_k}$, which stabilizes gradients during training. The attention weights are then passed through a softmax layer that normalizes the weights to sum to 1. The fact that $W_Q$ and $W_K$ are different matrices allows attention to be non-symmetric: if token i attends to token j, this does not necessarily mean that token j will attend to token i. The output of the attention unit for token i is the weighted sum of the value vectors of all tokens, weighted by $a_{ij}$, the attention from i to each token.

The attention calculation for all tokens can be expressed as one large matrix calculation, which is useful for training due to computational matrix operation optimizations which make matrix operations fast to compute. The matrices Q, K, and V are defined as the matrices where the ith rows are vectors $q_i$, $k_i$, and $v_i$ respectively.

$$\text{Attention}(Q, K, V) = \text{softmax}\left(\frac{QK^T}{\sqrt{d_k}}\right)V$$

Multi-Head Attention

One set of ($W_Q$, $W_K$, $W_V$) matrices is referred to herein as an attention head, and each layer in a transformer model has multiple attention heads. While one attention head attends to the tokens that are relevant to each token, with multiple attention heads the model can learn to do this for different definitions of "relevance." The relevance encoded by transformers can be interpretable by humans. For example, in the natural language context, there are attention heads that, for every token, attend mostly to the next word, or attention heads that mainly attend from verbs to their direct objects. Since transformer models have multiple attention heads, they have the possibility of capturing many levels and types of relevance relations, from surface-level to semantic. The multiple outputs for the multi-head attention layer are concatenated to pass into the feed-forward neural network layers.

Each encoder comprises two major components: a self-attention mechanism and a feed-forward neural network. The self-attention mechanism takes in a set of input encodings from the previous encoder and weighs their relevance to each other to generate a set of output encodings. The feed-forward neural network then further processes each output encoding individually. These output encodings are finally passed to the next encoder as its input, as well as the decoders.

The first encoder takes position information and embeddings of the input data as its input, rather than encodings. The position information is used by the transformer to make use of the order of the input data. In various examples described herein, the position embedding may describe an order of a sequence of words.

Each decoder layer comprises three components: a self-attention mechanism (e.g., scaled dot product attention), an attention mechanism over the encodings, and a feed-forward neural network. The decoder functions in a similar fashion to the encoder, but an additional attention mechanism is inserted which instead draws relevant information from the encodings generated by the encoders. In a self-attention layer, the keys, values and queries come from the same place—in the case of the encoder, the output of the previous layer in the encoder. Each position in the encoder can attend to all positions in the previous layer of the encoder. In "encoder-decoder attention" layers (sometimes referred to as "cross-attention"), the queries come from the previous decoder layer, and the keys and values come from the output of the encoder. This allows every position in the decoder to attend over all positions in the input sequence. The decoder is attending to the encoder features.

FIG. 1 illustrates an example system 100 effective to provide query evaluation for image retrieval and conditional image generation, in accordance with various aspects of the present disclosure. As shown, a query understanding and enrichment component 112 may receive an input query 110 and/or context data from a natural language processing system (e.g., a natural language processing system employed by a voice-enabled personal assistant). As previously described, the input query may be a user request (e.g., "show me an image of the Space Needle") or a system response to a user request (e.g., the system response "George Washington was the first President of the United States" in response to the user request "Who was the first President of the United States"). In some examples, the context data may include text and/or structured data representations of previous turns of a dialog in which a user is currently engaged, previous actions taken during the dialog session, and/or other information that may be relevant to performing the requested action (e.g., a device ID identifying a device on which the user request was received, state data indicating a state of the device, time and/or geolocation information, account ID information, a state of other devices associated with the account ID, etc.).

In various examples, the natural language processing system from which the input query 110 and/or context data may be received may be a language model-based system, such as that described below in reference to FIG. 2. As described in further detail below, the query understanding and enrichment component 112 may include a natural language processing encoder trained to encode input query 110. For example, a natural language encoder such as BERT, an autoencoder, and/or another type of natural language encoder may encode the input query 110 into a high-dimensional vector space. The query understanding and enrichment component 112 may include a variety of machine learning classifiers (e.g., classifier heads) that may be used to understand the input query 110.

For example, a discard classifier 114 may determine whether the input query should be discarded for purposes of image generation and/or retrieval. For example, the input query may be a natural language processing system response that indicates a system error and/or inability to perform the requested action (such as where a user has requested a playback of a song that does not exist in any memory to which the natural language processing system has access). The discard classifier 114 may be trained to recognize such input queries that have been labeled as "discard" queries in the training data used to train the NLP encoder of query understanding and enrichment component 112 and/or the discard classifier 114. In various examples, the types of queries that should be discarded may be determined as a user experience (UX) design decision. Accordingly, training data labeled as "discard" queries may be decided upon by a team developing the UX for a particular service. As such, discard queries may vary from service to service. Similarly, training data for discard classifier head 314 (discussed in further detail below) may vary from service to service.

Entity classifier 120 may be a classifier trained to detect and/or recognize named entities present in an input query 110 (i.e., in the encoded representation thereof). For example, the entity classifier 120 may be configured to perform named entity recognition (NER) and/or entity resolution (ER) to determine entity data. NER is a technique used to identify segments of named entities in text data and to categorize the named entities into various predefined classes. Categorization of named entities into such classes is often referred to as "tagging" the named entities. In this context, "NER tags" are metadata that designates a particular class to a named entity. In text, named entities refer to terms that represent real-world objects such as people, places, organizations, locations, etc., which are often denoted by proper nouns.

In some examples, natural language processing may include entity resolution (ER). Entity resolution refers to disambiguation of an entity (e.g., a named entity in text) according to records stored in memory (e.g., graph/entity image index 142 and/or another entity index). In various examples, high quality images may be selected for storage in association with a given entity ID in the graph/entity image index 142 so that images retrieved for a given entity are representative and high quality images for the entity. For example, if the input query 110 includes the proper noun "London," ER may be used to perform disambiguation to determine whether to link the named entity to a database entry for London in Ontario or a database entry for London in the United Kingdom. In various examples, the NER classes may be used during ER processing to disambiguate between multiple entities.

Generally, entity classifier 120 may determine whether or not the input query 110 includes and/or pertains to a particular named entity (e.g., a person, place, proper noun, title, etc.). In some further examples, the entity classifier 120 may resolve named entities included in the input queries 110, while in other examples, resolution of the named entities may be relegated to a different component. Input queries 110 that include named entities may be labeled as including an entity mention (e.g., with entity indicator data) and may be subjected to an entity image retrieval workflow that is part of image retrieval 132, as described in further detail below. Input queries 110 determined to include named entities may not be used for image generation 134 in order to prevent hallucinations associated with image generation 134 and/or to prevent depicting the named entity (e.g., a person, place, business, group of people, etc.) in a misleading, unflattering, and/or otherwise undesirable and/or impermissible way.

Temporal relevance classifier 116 may include a machine learning classifier used to classify the encoded representations of the input query 110 as temporally relevant or not temporally relevant. The temporal relevance classifier 114 may be trained to recognize such input queries that have been labeled as "temporally relevant" queries and input queries that have been labeled as "not temporally relevant" in the training data used to train the NLP encoder of query understanding and enrichment component 112 and/or the temporal relevance classifier 116.

Temporal relevance indicates that the input query 110 has a temporal component. For example, an input query of "show me a volcano" may not have temporal relevance as, generally speaking, a volcano image may relate to any time period. Conversely, a request such as "How old was George Washington when he became president" has a temporal component as it relates to the age of a person during a particular time period. Another example of a temporally relevant input query 110 may be "what band played at [arena name] yesterday?"

Input queries 110 that are classified as being temporally relevant may be encoded with temporal relevance data (e.g., temporal features) to represent the temporal relevance data. During image retrieval 132 the temporal relevance data may be used to retrieve images that are not only relevant to the query, but which are also relevant in the temporal dimension to the temporal information included in the query. For example, for an input query "show me an image of St. Louis in 1905," an image that shows present day St. Louis may be highly relevant to the subject of the request, but would not capture the temporal context of the input query. However, if the temporal information (e.g., [year: 1905]) is encoded, it may be used to retrieve images that are most relevant to not only the subject (e.g., "image of St. Louis"), but also to the particular year mentioned in the input query 110.

Impermissible classifier 122 may determine whether the input query is impermissible for image retrieval 132 and/or image generation 134. For example, the input query may be a request that violates a particular rule, guardrail, and/or may otherwise be deemed impermissible for image retrieval 132 and/or image generation 134. The impermissible classifier 122 may be trained to recognize such input queries that have been labeled as "impermissible" queries in the training data used to train the NLP encoder of query understanding and enrichment component 112 and/or the impermissible classifier 122.

Retrieval classifier 118 may be trained to determine whether input queries 110 are appropriate for the image retrieval 132 task. Similarly, generation classifier 124 may be trained to determine whether input queries 110 are appropriate for the image generation 134 task. In various examples, the retrieval classifier 118 and/or the generation classifier 124 may consider signals output by the various other classifiers of query understanding and enrichment component 112. For example, if the entity classifier 120 indicates that the input query 110 is relevant to a particular personality (e.g., an entity), this may be a strong signal to both retrieval classifier 118 and generation classifier 124. In particular, input queries 110 that relate to recognized entities may not be appropriate for image generation 134 and may only be permissible for image retrieval 132. Accordingly, the retrieval classifier 118 may learn, during training, that input queries 110 that are labeled as including entities (by entity classifier 120) are appropriate for image retrieval 132. Similarly, the generation classifier 124 may learn, during training, that input queries 110 that are labeled as including entities (by entity classifier 120) are not appropriate for image generation 134.

Generally, retrieval classifier 118 may be trained using training data instances that include sample input queries that are labeled with binary labels indicating whether the particular input query (for a given training data instance) is appropriate for image retrieval 132. Similarly, generation classifier 124 may be trained using training data instances that include sample input queries that are labeled with binary labels indicating whether the particular input query (for a given training data instance) is appropriate for image generation 134. Generally, input queries 110 that are suitable for image generation 134 may be deemed "creative" queries (creative inputs) by human annotators and/or automatic annotation classifiers. Creative queries may be queries that do not include a mention of a recognized entity (e.g., "show me a rocket ship orbiting a distant star").

In various examples, the query understanding and enrichment component 112 may include a query rewriter that may rewrite input queries 110 into a form that is more suitable for either the image generation 134 task and/or the image retrieval 132 task. For example, if a user first asks "What city is [name of building] in?" followed by the input query "When was it built?", the query rewriter may rewrite the follow-up query as "When was [name of building] built?"

As shown in FIG. 1, input queries 110 that are labeled as non-discard (by discard classifier 114), permissible (by impermissible classifier 122), retrieval-suitable (by retrieval classifier 118) may be sent to query encoder 130. Query encoder 130 may be a natural language encoder trained to generate query embeddings for the image retrieval task). The query encoder 130 may be, for example, the CLIP encoder and/or another encoder that is trained using text-image pairs with contrastive learning (e.g., positive samples representing matched images and image captions and negative samples with mismatched images and image captions). The query encoder 130 may generate embedding data that semantically represents the input query 110 (whether the original query or a rewritten query). Similarly, the images stored in image index 140 may be embedded using an image encoder (in a common embedding space with the text encodings) that is trained together with the query encoder 130. Contrastive learning may be used to force embeddings of captions and images in positive samples to be more similar to one another, while pushing embeddings of mismatched images/captions in negative samples away from one another.

Image retrieval 132 may involve finding the image embeddings (e.g., stored in image index 140) that are most similar to the query embedding representing the input query 110 and output by query encoder 130. Finding the most similar image embeddings in this context refers to using a vector similarity metric to compare the query embedding (e.g., a vector) to the candidate image embeddings to determine the most similar embeddings. Vector similarity metrics include cosine distance, cosine similarity, Euclidean distance, etc.

In various examples, if the input query 110 includes a named entity that has been resolved (e.g., by entity classifier 120 and/or by a separate entity resolution component), instead of searching the image index 140, a graph-based entity index (e.g., a graph-based data structure) may be searched using the embedding of the input query 110 (e.g., using a graph query composed in a graph query language). In such cases, only the image embeddings that are relevant to the named entity may be searched in order to reduce latency and compute requirements.

As shown in FIG. 1, input queries 110 that are labeled as non-discard (by discard classifier 114), permissible (by impermissible classifier 122), and generation-suitable (by generation classifier 124) may be sent to image generation 134. In various examples, image generation 134 may be a generative model trained to generate image data from text prompts and/or combinations of text and image data prompts. Examples of the generative model may be a latent diffusion-based model and/or a generative adversarial model (e.g., a GAN). Any number of images may be generated for the input query 110. In some examples, input queries 110 may be appropriate for both image generation 134 and image retrieval 132. For example, an input query 110 may be classified as appropriate for both retrieval (by retrieval classifier 118) and generation (by generation classifier 124). An example may be "show me an image of a blue dragon flying over a snowy mountain." While this example query may be a creative query, the query does not include any entities, and so the query may be appropriate for both image generation 134 and image retrieval 132. There may or may not be any images that are sufficiently relevant to the query in the image index 140. For example, the image retrieval 132 task may not return any image results if the cosine similarity is less than a threshold similarity. In such a case, one or more of the generated images generated by image generation 134 may be output on a display of the device 102. However, in instances in which there are both generated images and retrieved images, the image re-ranking/guardrails component 136 may be configured to output the retrieved images on device 102 instead of the generated images.

In some other examples, retrieved images may be sent from the image retrieval 132 to the image generation 134 (as indicated by the arrow between the two components in FIG. 1). For example, a user may ask to see images of cats and a number of images of cats may be retrieved. In various examples, these retrieved images may be sent to a compositional image generator of the image generation 134. A compositional image generator may be an artificial intelligence-based and/or algorithmic based image generator that may aggregate and/or combine the input images to generate one or more compositional images that are representative of the input retrieved images.

Image re-ranking/guardrails component 136 may include a ranking model that may be trained to select the most relevant images to output among a list of candidate images. As previously described, the image re-ranking/guardrails component 136 may select retrieved images (if any) over generated images. For retrieved images, the image re-ranking/guardrails component 136 may be trained to favor recent images (determined based on image metadata) absent temporal information in the input query indicating a particular temporal relevance. Additionally, the image re-ranking/guardrails component 136 may implement guardrails that may control which images are permissible for output (e.g., to prevent display of inappropriate images (such as age-restricted content when the output device is registered with a child account)). The top K images 150 that are ranked and deemed permissible for output may be sent to device 102 (and/or any number of other devices) for display. In various examples, depending on the particular user experience desired, a user may have the option of having either retrieved images, generated images, or both displayed for a given input query 110.

Figure 2:
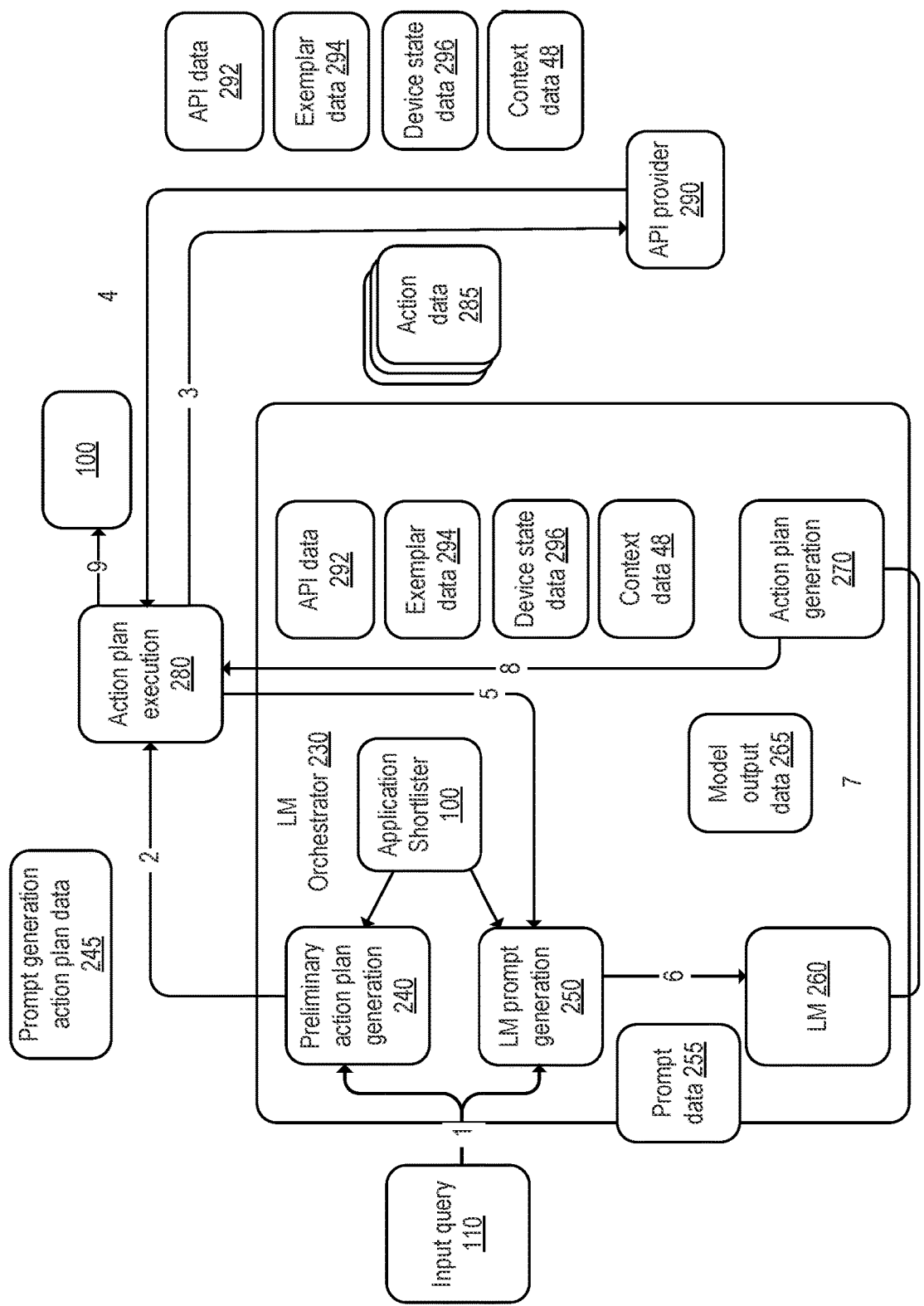
FIG. 2 depicts an example language model-based natural language processing flow, in accordance with various aspects of the present disclosure.

FIG. 2 depicts an example language model-based natural language processing flow, in accordance with various aspects of the present disclosure. In various examples, the example natural language processing flow depicted in FIG. 2 may be used to respond to user queries and the responses to the user queries may be the input queries 110 of FIG. 1. In other examples, the example natural language processing flow in FIG. 2 may send received user queries (either original user queries or rewritten user queries) to system 100 for potential image retrieval/generation. The example architecture in FIG. 2 includes an LM orchestrator 230 and various other components for determining an output action responsive to a user input. The architecture may further include an action plan execution component 280 and an API provider component 290. With reference to FIG. 2, the LM orchestrator 230 may include a preliminary action plan generation component 240, a LM prompt generation component 250, an LM 260, and an action plan generation component 270. In various examples, the LM 260 may be a generative model.

In some examples, the LM 260 may be a transformer-based seq2seq model involving an encoder-decoder architecture. In some such embodiments, the LM 260 may be a multilingual (approximately) 20 billion parameter seq2seq model that is pre-trained on a combination of denoising and Causal Language Model (CLM) tasks in various languages (e.g., English, French, German, Arabic, Hindi, Italian, Japanese, Spanish, etc.), and the LM 260 may be pre-trained with approximately 1 trillion tokens. Being trained on CLM tasks, the LM 260 may be capable of in-context learning. An example of such a LLM is Alexa Teacher Model (Alexa™).

In various examples, the input to the LM 260 may be in the form of a prompt (e.g., prompt data). A prompt may be a natural language input, for example, an instruction, for the LM 260 to generate an output according to the prompt. The output generated by the LM 260 may be a natural language output responsive to the prompt. The prompt and the output may be text in a particular spoken language. For example, for an example prompt "how do I cook beans?", the LM 260 may output a recipe (e.g., a step-by-step process) to cook beans. As another example, for an example prompt "I am hungry. What restaurants in the area are open?", the LM may output a list of restaurants near the user that are open at the current time.

The LM 260 may be configured using various machine learning techniques. For example, in some embodiments, the LM 260 may be configured (e.g., "fine-tuned") using few-shot learning. In few-shot learning, the model learns how to learn to solve the given problem. In this approach, the model is provided with a limited number of examples (i.e., "few shots") from the new task, and the model uses this information to adapt and perform well on that task. Few-shot learning may require fewer amount of training data than implementing other fine-tuning techniques. For further example, in some embodiments, the LM 260 may be configured using one-shot learning, which is similar to few-shot learning, except the model is provided with a single example. As another example, in some embodiments, the LM 260 may be configured using zero-shot learning. In zero-shot learning, the model solves the given problem without examples of how to solve the specific/similar problem and just based on the model's training dataset. In this approach, the model is provided with data sampled from a class not observed during training, and the model learns to classify the data.

The LM orchestrator 230 may be configured for generating the prompt to be used by the LM 260 to determine an action responsive to a user input. As shown in FIG. 2, the LM orchestrator 230 receives (at step 1) input query 110. In some instances, the input query 110 may correspond to a text or tokenized representation of a user input. For example, prior to the LM orchestrator 230 receiving the input query 110, another component (e.g., an ASR component) may receive audio data representing the user input. The ASR component may perform ASR processing on the audio data to determine ASR output data corresponding to the user input. As previously described, an ASR component may determine ASR data that includes an ASR N-best list including multiple ASR hypotheses and corresponding confidence scores representing what the user may have said. The ASR hypotheses may include text data, token data, etc. as representing the input utterance. The confidence score of each ASR hypothesis may indicate the ASR component's level of confidence that the corresponding hypothesis represents what the user said. The ASR component may also determine token scores corresponding to each token/word of the ASR hypothesis, where the token score indicates the ASR component's level of confidence that the respective token/word was spoken by the user. The token scores may be identified as an entity score when the corresponding token relates to an entity. In some instances, the input query 110 may include a top scoring ASR hypothesis of the ASR data.

As illustrated in FIG. 2, the input query 110 may be received at the preliminary action plan generation component 240 and the LM prompt generation component 250 of the LM orchestrator 230. The preliminary action plan generation component 240 processes the input query 110 to generate prompt generation action plan data 245 corresponding to an instruction(s) (e.g., a request(s)) for one or more portions of data usable to generate a language model prompt for determining an action responsive to the user input). The preliminary action plan generation component 240 and/or the LM prompt generation component 250 may also be implemented as LLMs or other language models configured to augment the input query 110 with relevant information that assists the LM 260 in completing the task represented by the input query 110. In some examples, the preliminary action plan generation component 240 may determine one or more portions of data that is determined to be relevant for processing of the user input. The one or more portions of data may represent one or more actions (e.g., API definitions), one or more exemplars corresponding to the actions (e.g., example model outputs including an appropriate use of the API), one or more device states corresponding to one or more devices associated with the user input, and/or one or more other contexts associated with the user input. For example, if the input query 110 represents a user input of "please turn on the kitchen lights every morning at 7 am," then the preliminary action plan generation component 240 may determine prompt generation action plan data 245 representing instructions for one or more actions (e.g., API definitions) related to turning on the kitchens lights every morning, one or more exemplars corresponding to the related actions, one or more device states corresponding to one or more devices associated with the "kitchen lights", and one or more other contexts. For further example, if the input query 110 represents a user input of "What is the elevation of Mt. Everest," then the preliminary action plan generation component 240 may determine prompt generation action plan data 245 representing instructions for one or more actions (e.g., API definitions, specifications, schemas) related to the user input and one or more exemplars corresponding to the related actions, as other information, such as devices states or other contextual information (user profile information, device profile information, weather, time of day, historical interaction history) may not be relevant. In some examples, the LM may send the input query 110 and/or a system response to system 100 for potential image retrieval and/or generation. As previously described, in some cases, retrieved and/or generated images may accompany a natural language processing response. For example, the natural language processing system may answer a user's question while displaying an image that is relevant to the answer to the question.

In some examples, the prompt generation action plan data 245 may include one or more executable API calls usable for retrieving the one or more portions of data from the corresponding component. For example, instructions included in the prompt generation action plan data 245 may include "FETCH_API," "FETCH_EXEMPLAR," "FETCH_DEVICE_STATE," "FETCH_CONTEXT," etc., along with optional API arguments/inputs. In some embodiments, the prompt generation action plan data 245 may also include the input query 110. The prompt generation action plan data 245 may be sent (at step 2) to the action plan execution component 280. In some examples, system 100 may include an API that the LM 260 may call.

In some examples, the preliminary action plan generation component 240 may be configured to process the input query 110 to determine a representation of the user's request. In various examples, the representation of the user's request may be a reformulation of the user's request. For example, the if the input query 110 represents a user input of "I have always wanted to travel to Japan, I have heard it's beautiful. How tall is Mt. Fuji?", then the preliminary action plan generation component 240 may determine the representation of the user's request as being "How tall is Mt. Fuji," or the like. The preliminary action plan generation component 240 may generate the prompt generation action plan data 245 using the determined representation of the user's request. System 100 may be used to retrieve an image of the recognized entity "Mt. Fuji" from image index 140 to accompany the answer to the question about the height of the mountain.

In some examples, the preliminary action plan generation component 240 may implement one or more machine learning (ML) models. A first ML model(s) may be configured to take as input the input query 110 and generate a representation of the user's request. For example, the ML model may be a text summarization model or a text rewrite model. A second ML model (or the first ML model) may be configured to take as input the representation of the user's request (or the input query 110) and determine the one or more portions of data relevant for processing of the user input. For example, the second ML model may be a classifier trained to classify the user's request (or the input query 110) to determine data (or types of data) relevant to the processing of the user input (e.g., one or more related actions (e.g., API definitions), one or more exemplars corresponding to the one or more related actions, one or more device states corresponding to one or more related devices, one or more related contexts, etc.)

In other embodiments, the preliminary action plan generation component 240 may be an LM, similar to the LM 260. In such embodiments, the architecture (e.g., LLM 80) may include a further component configured to generate a prompt to be provided to the LLM (e.g., similar to the LM prompt generation component 250) or the prompt may be generated by the LM prompt generation component 250. The component may generate a prompt (e.g., according to a template) including the input query 110 and instructions to determine the one or more portions of data (or types of data) relevant to the processing of the user input. The LLM may process the prompt and generate model output data representing the one or more portions of data (or types of data). The preliminary action plan generation component 240 may process the model output data to determine the prompt generation action plan data 245.

The action plan execution component 280 may process the prompt generation action plan data 245 to execute the one or more instructions to retrieve/receive data corresponding to the user input and that may be used to generate the language model prompt. In various examples, the prompt generation action plan data 245 and/or other action plan data generated by the processing flow depicted in FIG. 2 may include a call to the system 100 for image retrieval and conditional image generation. In such examples, the call may include the user input query and/or system response (or rewritten versions thereof). As shown in FIG. 2, the action plan execution component 280 processes the prompt generation action plan data 245 to generate action data 285 representing an action included in the prompt generation action plan data 245 (e.g., a single instruction, such as FETCH_CONTEXT). For example, in the situation where the action is represented by an API call, the action data 285 may represent the action plan execution component 280 executing the API call included in the prompt generation action plan data 245. The action data 285 may be sent (at step 3) to the API provider component 290. In the situation where the prompt generation action plan data 245 includes more than one instruction, the action plan execution component 280 may generate more than one instance of action data 285 (e.g., one instance for each instruction included in the prompt generation action plan data 245) and send each instance to the API provider component 290.

The API provider component 290 may process the (one or more instances of the) action data 285 and cause the retrieval of the (one or more portions of) data associated with the action data 285. The API provider component 290 may include a knowledge provider component. The knowledge provider component may include an API retrieval component, an exemplar retrieval component, a device state retrieval component, and "other" context retrieval component. The knowledge provider component may provide the action data 285 to the component(s) configured to determine the data corresponding to the request(s) represented by the action data 285.

For example, the API retrieval component (not shown) may process the action data 285 to generate API data 292 representing one or more APIs that correspond to an action performable with respect to the user input. For example, if the user input corresponds to "turn on the kitchen light," the API retrieval component may determine an API usable to control a device and include an API definition corresponding to the API in the API data 292. In some embodiments, the API definition may include one or more API call frameworks for instructing/requesting that the API perform an action (e.g., turn_on_device (device: [device name]), turn_off_device (device: [device name]), set_device_temperature (device: [device name]); temperature: [temperature], set_device_volume (device: [device name]; volume: [volume value]), etc.). In some embodiments, the API definition may include a natural language description of the functionality of the API (e.g., a natural language description of the actions performable by the API/API call framework). For example, for the abovementioned API determined to be associated with the user input of "turn on the kitchen light," the API definition may further include a natural language description of "used to power on a device." In some embodiments, the one or more API definitions may be included in the API data 292 based on them being semantically similar to the user input. For example, the API retrieval component may be capable of comparing (e.g., using cosine similarity) (an encoded representation of) the user input to (an encoded representation of) the API definition to determine a semantic similarity between the user input and the API definition (e.g., a semantic similarity between the user input and the natural language description of the functionality of the API included in the API definition). If the API definition is determined to be semantically similar to the user input, then the corresponding API definition may be included in the API data 292. In some embodiments, the API retrieval component may include the top-n identified API definitions in the API data 292. The API data 292 may be sent (at step 4) to the action plan execution component 280 as shown in FIG. 2.

For further example, the exemplar retrieval component may process the action data 285 to generate exemplar data 294 representing one or more exemplars associated with one or more APIs (e.g., the API represented by the API data 292). As used herein, an "exemplar" associated with an API corresponds to an example use of the API (e.g., an example language model output including use of the API (e.g., via a corresponding API call) with respect to a user input, where the user input is similar to the current user input. For example, for an API associated with the API call framework "turn_on_device (device: [device name])," and the current user input "please turn on the kitchen lights" the exemplar retrieval component may select an exemplar including the example user input of "please turn on the lights" and the API call of "turn_on_device (device="lights")." In some embodiments, an exemplar represented in the exemplar data 294 may include an example user input, a natural language description of an action associated with the example user input, an executable API call associated with the example user input and the action associated with the example user input, an example result of the API call, a natural language description of an action to be performed in response to the example result of the API call, and/or an output responsive to the user input. For example, for an API associated with the API call frameworks "Routine.create_turn_on_action(device: str)" and "Routine.create_time_trigger(hour: [hour value])" and the current user input "please turn on the kitchen light everyday at 7 am," the exemplar retrieval component may select an exemplar representing:
{
Customer: turn on the kitchen light everyday at 7 am
Thought: the customer is trying to create a routine
Action:
Routine.create_routine
   (trigger=Routine.create_time_trigger(hour=7), action=Routine.create_turn_on_action (device="kitchen light"))
Observation: routine created successfully
Thought: time to respond
Response: I have created a routine for you. Anything else?
}

Although not illustrated in FIG. 2, in some embodiments, the API provider component 290 and/or a knowledge provider component may provide the exemplar retrieval component with the action data 285 and a list of API call(s) to which the determined exemplars are to be associated (e.g., the API call(s) included in the API data 292). In some embodiments, the one or more exemplars may be included in the exemplar data 294 based on them being semantically similar to the user input. For example, the exemplar retrieval component may be capable of comparing (e.g., using cosine similarity) the current user input to the example user input included in an exemplar to determine a semantic similarity between the current user input and the example user input. If the example user input is determined to be semantically similar to the current user input, then the corresponding exemplar may be included in the exemplar data 294. In some embodiments, the exemplar retrieval component may include the top-n identified exemplars in the exemplar data 294. The exemplar data 294 may be sent (at step 4) to the action plan execution component 280 as shown in FIG. 2.

As another example, a device state retrieval component (not shown in FIG. 2) may process the action data 285 to generate device state data 296 representing one or more states of one or more devices associated with/relevant to the user input (e.g., whether the device is powered on or off, a volume level associated with the device, etc.). For example, if the user input corresponds to "Please turn on the kitchen light," the device state data 296 may represent the state(s) of one or more devices that are associated with a functionality of turning on a light, are associated with the kitchen, are associated with a user profile of a user who provided the user input, etc. In some embodiments, the device(s) may be determined to be relevant based on a device location(s). For example, devices (e.g., microwave, oven, fridge, smart speaker, etc.) near the user device (e.g., located in the kitchen) that received the user input may be used to determine the device state data 296. In some embodiments, the one or more devices may be determined to be relevant to the user input based on device profile information. For example, the device state retrieval component may be capable of comparing device profile information for a device (e.g., device ID, device group ID, a location associated with the device, etc.) to the user input to determine whether the device is relevant to the user input. In some embodiments, the device state retrieval component may include the top-n identified device states in the device state data 296. The device state data 296 may be sent (at step 4) to the action plan execution component 280 as shown in FIG. 2.

As a further example, a context retrieval component (not shown) may process the action data 285 to generate other context data 48 (apart from the device state data 296, the API data 292, the exemplar data 294, etc.) representing one or more contexts associated with/relevant to the user input. For example, the other context data 48 may represent user profile information (age, gender, associated devices, user preferences, etc.), visual context (e.g., content being displayed by devices associated with the user profile, content being displayed by the user device that captured the user input, etc.), knowledge context (e.g., one or more previous user inputs and/or system generated responses, etc.), time of day, geographic/device location, weather information, etc. In some embodiments, the other context retrieval component 48 may include the top-n identified context in the other context data 48. The other context data 48 may be sent (at step 4) to the action plan execution component 280 as shown in FIG. 2.

In some embodiments, the knowledge provider component may be configured to cause one or more of the API retrieval components, the exemplar retrieval component, the device state retrieval component, and the other context retrieval component to process based on the data output by one or more of the components of the knowledge provider component. For example, if the output of the API retrieval component (e.g., the API data 292) indicates that a related API definition was identified, then the knowledge provider component (or another component) may cause the exemplar retrieval component to process to determine one or more exemplars related to the identified API definitions. For further example, if the output of the API retrieval component (e.g., the API data 292) indicates that a particular API definition was identified (e.g., an API definition for controlling a device), then the knowledge provider component may cause the exemplar retrieval component to process as described above, and may further cause the device state retrieval component and/or the other context retrieval component to process to determine device states for one or more related devices and/or other contextual information based on the identified API definition being associated with controlling a device. In some embodiments, the knowledge provider component may determine to cause the components to process based on instruction(s) included in the action data (e.g., based on a determination made by preliminary action plan generation component 240, as discussed above).

The action plan execution component 280 may send (step 5) the data received from the API provider component 290 (e.g., the API data 292, the exemplar data 294, the device state data 296, and the other context data 48) to the LM prompt generation component 250. The LM prompt generation component 250 may be configured to generate prompt data 255 (e.g., using the input query 110, the API data 292, the exemplar data 294, the device state data 296, and/or the other context data 48) to be used by the LM 260.

In some examples, the LM prompt generation component 250 may generate the prompt data 255 representing a prompt for input to the LM 260. In some embodiments, such prompt data 255 may be generated based on combining the input query 110, the API data 292, the exemplar data 294, the device state data 296, and the other context data 48. The prompt data 255 may be an instruction to determine an action(s) responsive to the input query 110 given the other information (e.g., the API data 292, the exemplar data 294, the device state data 296, the other context data 48) included in the prompt data 255. In some embodiments, the LM prompt generation component 250 may also include in the prompt data 255 a sample processing format to be used by the LM 260 when processing the prompt and generating the response. In some embodiments, the prompt data 255 may be generated according to a template format. For example, the prompt data 255 may adhere to a template format of:

{
You have access to the following API's:
[API(s) (e.g., the API data 192)]
Use the following format:
User: the input utterance of a user
Thought: optionally think about what to do
Action: take an action by calling APIs
Observation: what the API execution returns
. . . (this thought/action/action input/observation can repeat N times)
Thought: done
Response: the proper response to the user (end of turn)
Examples:
[Exemplar(s) (e.g., the exemplar data 294)]
Context: [device state(s) (e.g., the device state data 296)]
[other
context(s) (e.g., the other context data 48)]
User: [the user input (e.g., the input query 110)]
}

In some examples, the template format may instruct the LM 260 as to how it should process to determine the action responsive to the user input and/or how it should generate the output including the action response to the user input. For example, as shown in the example above, the format may include the label "User:" labelling the following string of characters/tokens as the user input. For further example, the format may include the label "Thought:" instructing the LM 260 to generate an output representing the determined interpretation of the user input by the LM 260 (e.g., the user is requesting [goal of the user input], the user is trying to [goal of the user Input], etc.) As another example, the format may include the label "Observation:" labeling the following string of characters/tokens as the result of performance of an action determined by the LM 260/the LM 260's interpretation of the result of the performance of the action determined by the LM 260. As a further example, the format may include a label of "Response:" instructing the LM 260 to generate a response (e.g., a natural language output for a user) to the prompt.

Following such a template format, for example, and for a user input of "turn on the living room light" and corresponding API data, exemplar data, device state data, and other context data, the LM prompt generation component 250 may generate example prompt data 255*a:*

{
You have access to the following API's:
Routine.turn_on_device (device: [device name]) turns a device on.
Use the following format:
User: the input utterance of a user
Thought: optionally think about what to do
Action: take an action by calling APIs
Observation: what the API execution returns
. . . (this thought/action/action input/observation can repeat N times)
Thought: done
Response: the proper response to the user (end of turn)
Examples:
User: turn on all indoor lights
Thought: the user is trying to turn lights on
Action: turn_on_device (device="indoor light 1")
turn_on_device (device="indoor light 2")
Observation: success success
Thought: time to respond
Response: Anything else I can help you with?
Context: the user has the following devices, bathroom light,
bedroom light, kitchen light, and living room light.
User: turn on the living room light.
}

In some embodiments, the LM prompt generation component 250 may also include in the prompt data an instruction to output a response that satisfies certain conditions. Such conditions may relate to generating a response that is unbiased (toward protected classes, such as gender, race, age, etc.), non-harmful, profanity-free, etc. For example, the prompt data may include "Please generate a polite, respectful, and safe response and one that does not violate protected class policy."

The LM 260 processes the prompt data 255 to generate model output data 265 representing an action responsive to the user input. For example, based on processing the example prompt data provided above, the LM 260 may output model output data 265: {"Thought: the user is trying to turn on the living room light; Action: turn_on_device (device="living room light")," } or the like. The model output data 265 is sent (at step 7) to the action plan generation component 270. The action plan generation component 270 may parse the model output data 265 to determine action plan data representing the action generated by the LM 260. For example, for the model output data 265: "Action: turn_on_device (device="living room light")," the corresponding action plan data may correspond to "turn_on_device (device="living room light")" (e.g., corresponding to the action generated by the LM 260, without the label of "Action"). In some embodiments, the action plan generation component 270 may determine an API call corresponding to the "Action" data included in the model output data 265. For example, in some embodiments, the action plan generation component 270 may fill in the arguments/inputs, if any, for the API call, which may be included in the action plan data. For further example, in some embodiments, the action plan execution component 280 may fill in the arguments/inputs, if any, for the API call.

In some embodiments, the LM orchestrator 230 (e.g., the action plan generation component 270 or another component of the LM orchestrator 230) may determine whether the LM 260 output satisfies certain conditions. Such conditions may relate to checking whether the output includes biased information (e.g., bias towards a protected class), harmful information (e.g., violence-related content, harmful content), profanity, content based on model hallucinations, etc. A model hallucination refers to when a model (e.g., a language model) generates a confident response that is not grounded in any of its training data. For example, the model may generate a response including a random number, which is not an accurate response to an input prompt, and then the model may continue to falsely represent that the random number is an accurate response to future input prompts. To check for an output being based on model hallucinations, the LM orchestrator 230 may use a knowledge base, web search, etc. to fact-check information included in the output.

In some cases, the action plan output by the action plan generation component 270 may include instructions to call an API of system 100 and/or the query understanding and enrichment component 112. The action plan may be sent (step 8) to the action plan execution component. In the example of FIG. 2, the action plan includes a call to an API of system 100. Accordingly, at step 9, the action plan execution component 280 may send input query 110 (e.g., the user query and/or natural language processing response) to the system 100.

Figure 3:
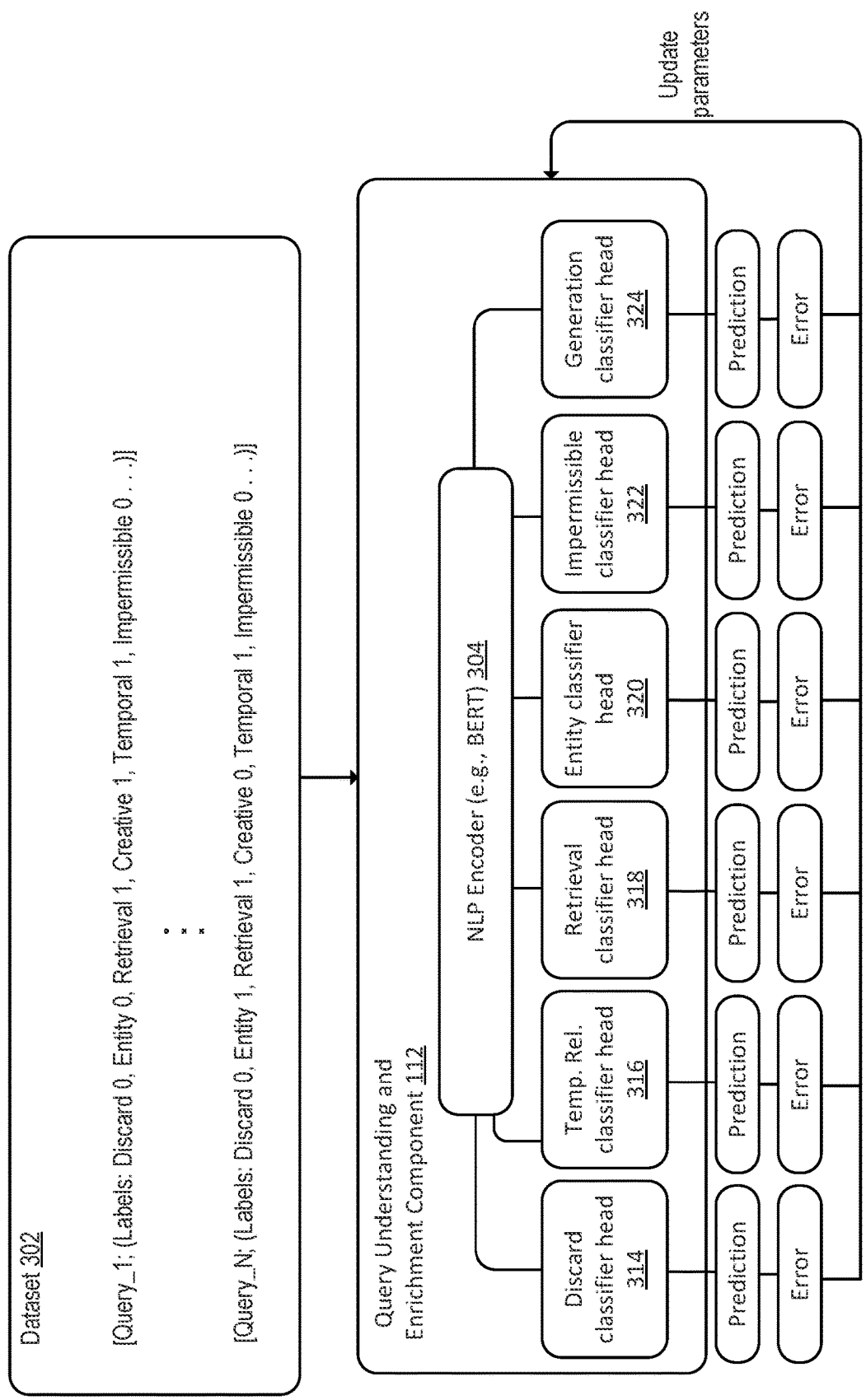
FIG. 3 illustrates examples for training a machine learning-based query understanding and enrichment component, in accordance with various aspects of the present disclosure.

FIG. 3 illustrates examples for training a machine learning-based query understanding and enrichment component 112, in accordance with various aspects of the present disclosure. In the example of FIG. 3, a training dataset 302 may comprise a plurality of queries [Query_1, Query_2, . . . , Query_N] that may include user requests and/or system responses, as previously described. Each query of the queries in training dataset 302 may be annotated with one or more labels (e.g., label data) for the various classifiers of the query understanding and enrichment component 112. In the examples depicted in FIG. 3, the labels are binary labels, however, in other examples, the labels may be represented using scores.

Each query of the training dataset 302 may be labeled according to the semantic content of the query itself. The discard label may indicate whether the query is appropriate for image generation/retrieval. For example, a query representing a system response that says "I'm sorry, I didn't understand" may not be appropriate for image generation/retrieval. Accordingly, such a query may be labeled with the Discard label "1" indicating that the discard classifier head 314 should predict that the query should be discarded (i.e., no image should be retrieved and/or generated for the query).

The entity label may indicate whether the query includes a mention of a known entity (e.g., a person, place, business, sports team, or other entity). As previously described, input queries that include entity mentions may not be appropriate for image generation 134. In addition, queries that include entity mentions may be routed to an entity-based retrieval that retrieves entity images from a structured graph-based database using the entity identifier as a query to consider only a subset of images associated with the particular entity. This entity-based image retrieval may be in contrast to a more compute/latency intensive text-based retrieval in which the query embedding may be compared to embeddings for a large volume of images stored in a general image repository (e.g., image index 140).

The creative label may indicate whether the query is a creative query that is appropriate for the image generation 134 using generative AI. Creative queries are queries that do not include entity mentions and which are deemed to pose low risk for creating images that are non-compliant with policies, regulations, guardrails, etc. For example, a query that says "show me an image of a tiger swimming" may be labeled as creative, while a query that says "show me a picture of [public figure name]" may be labeled as non-creative (e.g., creative 0).

The temporal label may indicate whether some portion of the query is temporally relevant. For example, a query that says "show me an image of the event that happened in [City name] yesterday" may have temporal relevance, while the query "show me a sunset" may not have temporal relevance. As previously described, queries with temporal relevance may have one or more temporal features encoded in order to retrieve and/or generate temporally-relevant images. The impermissible label may label whether a query is permissible for image generation/retrieval. Some queries may violate policies, guardrails, laws, or guidelines and should not be used for image generation/retrieval. For example, queries related to mathematical operations may not be permissible due to an applicable guideline. For example, generative models tend to hallucinate incorrect answers to mathematical queries. Similarly, image retrieval may retrieve semantically relevant, but incorrect images from image repositories. For example, an input query may be "2+2". This query may result in image retrieval of an image that shows "2+2=5." While this image may be highly relevant to the query, it is nonetheless incorrect. In still other examples, there may be a mathematical classifier head (not shown) that may determine whether queries are mathematical. In various examples, queries classified as mathematical may first be sent to a solver that may return a result (e.g., by calling a math API to obtain a correct result). The result may thereafter be used for image retrieval (without fear that an image depicting an incorrect result will be retrieved). However, in some other examples, mathematical queries may be labeled as impermissible. In other examples, requests for impermissible content may be labeled as impermissible (e.g., age-restricted content when the requesting account is associated with a minor).

Queries of the training dataset 302 may be encoded by a natural language encoder of the query understanding and enrichment component 112 (e.g., NLP encoder 304, which may be a transformer-based encoder such as BERT, etc.). In some examples, context data provided with the input query (e.g., device state information, previous turns of dialog, account information, etc.) may also be provided with the query and encoded. The encoded representation of a given query and any context (e.g., a multidimensional vector) may be sent to each classifier head of the query understanding and enrichment component 112 (e.g., discard classifier head 314, temporal relevance classifier head 316, retrieval classifier head 318, entity classifier head 320, impermissible classifier head 322, generation classifier head 324, etc.). Each classifier head may comprise a feed forward neural network (e.g., one or more fully-connected layers) and may make a prediction (prediction data) as described above classifying the input query according to the purpose of the classifier head. As previously described, the prediction may be a binary prediction and/or a score. Thereafter, the error data (e.g., the mathematical difference) between each prediction and the relevant label may be determined as an error vector. The error vector may be back propagated and gradient descent may be used to update the parameters of the NLP encoder 304 and/or the various classifier heads in order to minimize the error. The training process is recursive and may be repeated until the various classifier heads converge. In various examples, the NLP encoder 304 may be trained together (e.g., "end-to-end") with the various classifier heads so that the encoded representations of the input queries are useful for the various classification tasks. In other examples, a pre-trained NLP encoder 304 may be used and the parameters of each classifier head may be updated according to the error associated with that particular classifier head.

As described above in reference to FIG. 1, after training, the predictions of the classifier heads of the query understanding and enrichment component 112 may be used in determining whether to use image generation 134, image retrieval 132, neither, or both, for a given input query 110.

Figure 4:
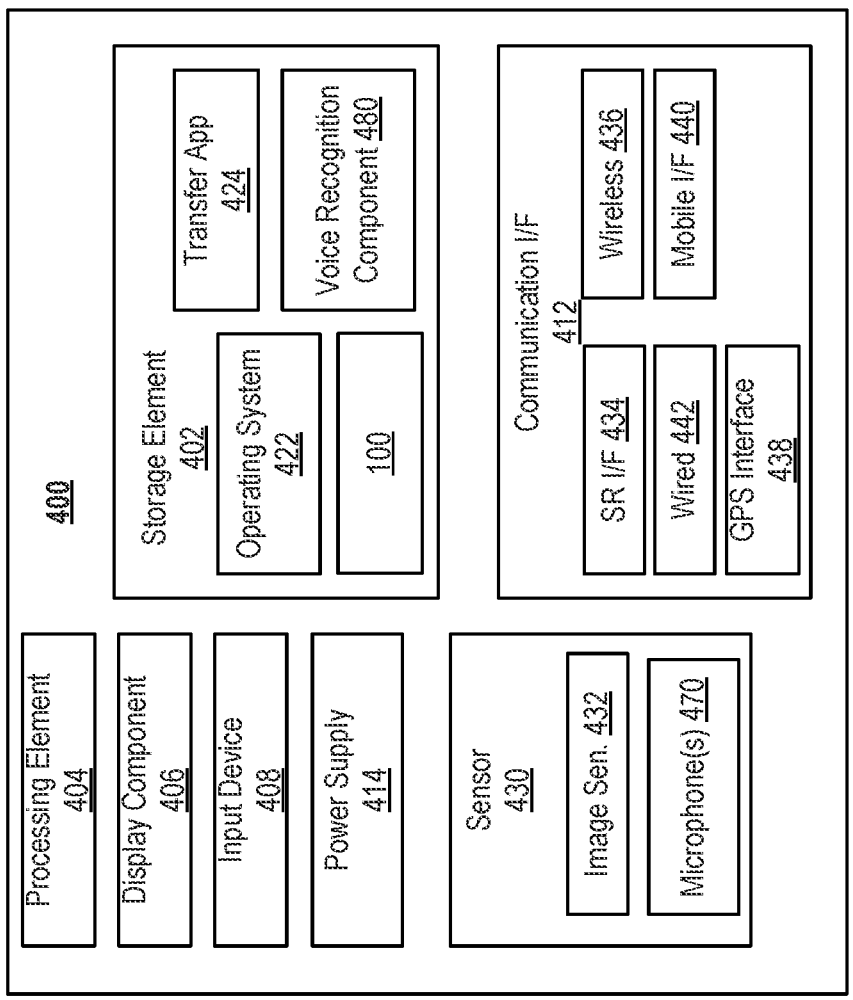
FIG. 4 is a block diagram showing an example architecture of a network-connected device that may be used in accordance with various embodiments described herein.

FIG. 4 is a block diagram showing an example architecture 400 of a network-connected device (e.g., a local network-connected device such as natural language processing-enabled device used to receive an input query 110 or another input device) that may be used to implement, at least in part, a natural language processing-enable device configured to receive spoken and/or other natural input commands, in accordance with various aspects of the present disclosure. It will be appreciated that not all devices will include all of the components of the architecture 400 and some user devices may include additional components not shown in the architecture 400. The architecture 400 may include one or more processing elements 404 for executing instructions and retrieving data stored in a storage element 402. The processing element 404 may comprise at least one processor. Any suitable processor or processors may be used. For example, the processing element 404 may comprise one or more digital signal processors (DSPs). In some examples, the processing element 404 may be effective to determine a wakeword and/or to stream audio data to a speech processing system. The storage element 402 can include one or more different types of memory, data storage, or computer-readable storage media devoted to different purposes within the architecture 400. For example, the storage element 402 may comprise flash memory, random-access memory, disk-based storage, etc. Different portions of the storage element 402, for example, may be used for program instructions for execution by the processing element 404, storage of images or other digital works, and/or a removable storage for transferring data to other devices, etc. In various examples, the storage element 402 may comprise one or more components of the query understanding and enrichment component 112.

The storage element 402 may also store software for execution by the processing element 404. An operating system 422 may provide the user with an interface for operating the computing device and may facilitate communications and commands between applications executing on the architecture 400 and various hardware thereof. A transfer application 424 may be configured to receive images, audio, and/or video from another device (e.g., a mobile device, image capture device, and/or display device) or from an image sensor 432 and/or microphone 470 included in the architecture 400. In some examples, the transfer application 424 may also be configured to send the received voice requests to one or more voice recognition servers. In various examples, the storage element 402 may include all or part of the system 100 for query evaluation for image retrieval and conditional image generation. For example, the storage element 402 may store the various encoder models and/or classifiers (and/or parameters thereof) described above in reference to FIGS. 1 and 3.

When implemented in some user devices, the architecture 400 may also comprise a display component 406. The display component 406 may comprise one or more light-emitting diodes (LEDs) or other suitable display lamps. Also, in some examples, the display component 406 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 406 may be effective to display content determined provided by a skill executed by the processing element 404 and/or by another computing device.

The architecture 400 may also include one or more input devices 408 operable to receive inputs from a user. The input devices 408 can include, for example, a push button, touch pad, touch screen, wheel, joystick, keyboard, mouse, trackball, keypad, light gun, game controller, or any other such device or element whereby a user can provide inputs to the architecture 400. These input devices 408 may be incorporated into the architecture 400 or operably coupled to the architecture 400 via wired or wireless interface. In some examples, architecture 400 may include a microphone 470 or an array of microphones for capturing sounds, such as voice requests. Voice recognition component 480 may interpret audio signals of sound captured by microphone 470. In some examples, voice recognition component 480 may listen for a "wakeword" to be received by microphone 470. Upon receipt of the wakeword, voice recognition component 480 may stream audio to a voice recognition server for analysis, such as a speech processing system. In various examples, voice recognition component 480 may stream audio to external computing devices via communication interface 412.

When the display component 406 includes a touch-sensitive display, the input devices 408 can include a touch sensor that operates in conjunction with the display component 406 to permit users to interact with the image displayed by the display component 406 using touch inputs (e.g., with a finger or stylus). The architecture 400 may also include a power supply 414, such as a wired alternating current (AC) converter, a rechargeable battery operable to be recharged through conventional plug-in approaches, or through other approaches such as capacitive or inductive charging.

The communication interface 412 may comprise one or more wired or wireless components operable to communicate with one or more other computing devices. For example, the communication interface 412 may comprise a wireless communication component 436 configured to communicate on a network, such as a computer communication network, according to any suitable wireless protocol, such as IEEE 802.11 or another suitable wireless local area network (WLAN) protocol. A short range interface 434 may be configured to communicate using one or more short range wireless protocols such as, for example, near field communications (NFC), Bluetooth, Bluetooth LE, etc. A mobile interface 440 may be configured to communicate utilizing a cellular or other mobile protocol. A Global Positioning System (GPS) interface 438 may be in communication with one or more earth-orbiting satellites or other suitable position-determining systems to identify a position of the architecture 400. A wired communication component 442 may be configured to communicate according to the USB protocol or any other suitable protocol.

The architecture 400 may also include one or more sensors 430 such as, for example, one or more position sensors, image sensors, and/or motion sensors. An image sensor 432 is shown in FIG. 4. An example of an image sensor 432 may be a camera configured to capture color information, image geometry information, and/or ambient light information.

Figure 5:
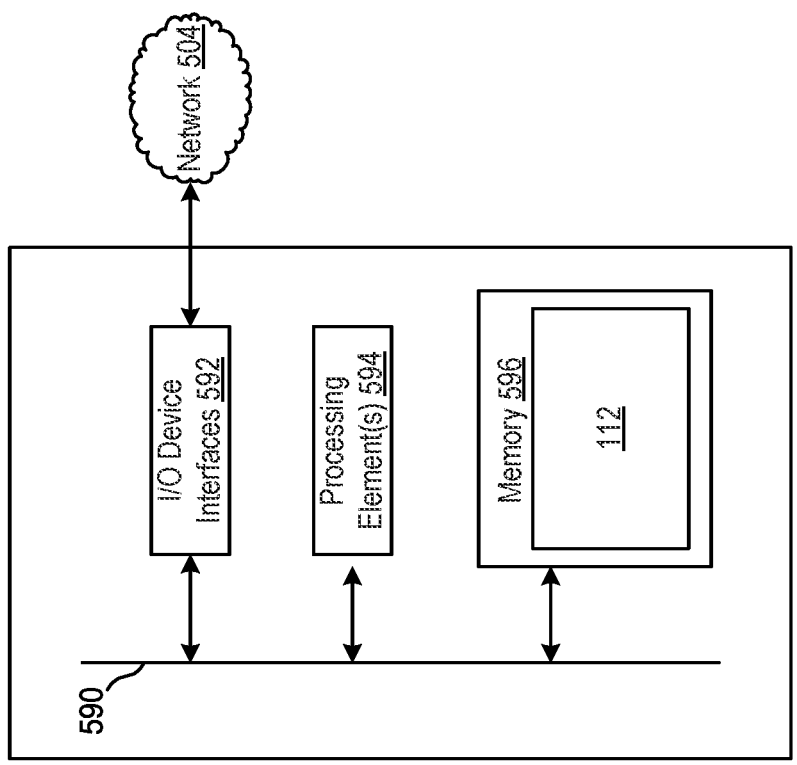
FIG. 5 is a block diagram showing an example architecture of a computing device that may be used in accordance with various embodiments described herein.

FIG. 5 is a block diagram conceptually illustrating example components of a remote device, such as a computing device executing a particular skill, a computing device executing one or more components of a speech processing system (e.g., ASR processing components, NLU processing components, applicable protocol recognition, etc.) and/or command processing. For example, the various components of FIG. 5 may be used to implement the query understanding and enrichment component 112. Multiple computing devices may be included in the system, such as one speech processing computing device for performing ASR processing, one speech processing computing device for performing NLU processing, one or more skill computing device(s) implementing skills, etc. In operation, each of these devices (or groups of devices) may include non-transitory computer-readable and computer-executable instructions that reside on the respective device, as will be discussed further below. The remote device of FIG. 5 may communicate with one or more other devices over a network 504 (e.g., a wide area network or local area network).

Each computing device of a speech processing system may include one or more controllers/processors 594, which may each include at least one central processing unit (CPU) for processing data and computer-readable instructions, and a memory 596 for storing data and instructions of the respective device. In at least some examples, memory 596 may store, for example, a shortlist of applications that may be determined for particular input query data. In some examples, memory 596 may store machine learning models of the LLM 80, such as machine learned models associated with various classifiers and/or natural language inference models (described in reference to FIG. 1), when loaded from memory 596. In various further examples, memory 596 may be effective to store instructions effective to program controllers/processors 594 to perform the various techniques described above in reference to FIGS. 1-3B. Accordingly, in FIG. 5, the query understanding and enrichment component 112 for LLM processing is depicted as being stored within memory 596, as an example. The memories 596 may individually include volatile random access memory (RAM), non-volatile read only memory (ROM), non-volatile magnetoresistive memory (MRAM), and/or other types of memory. Each computing device of a speech processing system (and/or a component thereof) may also include memory 596 for storing data and controller/processor-executable instructions. Each memory 596 may individually include one or more non-volatile storage types such as magnetic storage, optical storage, solid-state storage, etc. Each computing device of a speech processing system may also be connected to removable or external non-volatile memory and/or storage (such as a removable memory card, memory key drive, networked storage, etc.) through respective input/output device interfaces 592. In various examples, the feature data and/or training data used by the various machine learning models may be stored and/or cached in memory 596.

Computer instructions for operating each computing device of a natural language processing system may be executed by the respective device's controllers/processors 594, using the memory 596 as temporary "working" storage at runtime. A device's computer instructions may be stored in a non-transitory manner in non-volatile memory 596 (e.g., a non-transitory computer-readable memory), memory 596, or an external device(s). Alternatively, some or all of the executable instructions may be embedded in hardware or firmware on the respective device in addition to or instead of software.

Each computing device of the various computing devices described herein may include input/output device interfaces 592. A variety of components may be connected through the input/output device interfaces 592, as will be discussed further below. Additionally, each computing device of a speech processing system may include an address/data bus 590 for conveying data among components of the respective device. Each component within a computing device of a speech processing system may also be directly connected to other components in addition to (or instead of) being connected to other components across the bus 590.

As noted above, multiple devices may be employed in a single system. In such a multi-device system, each of the devices may include different components for performing different aspects of the system's processing. The multiple devices may include overlapping components. The components of a speech processing system, as described herein, are exemplary, and may be located as a stand-alone device or may be included, in whole or in part, as a component of a larger device or system.

Figure 6:
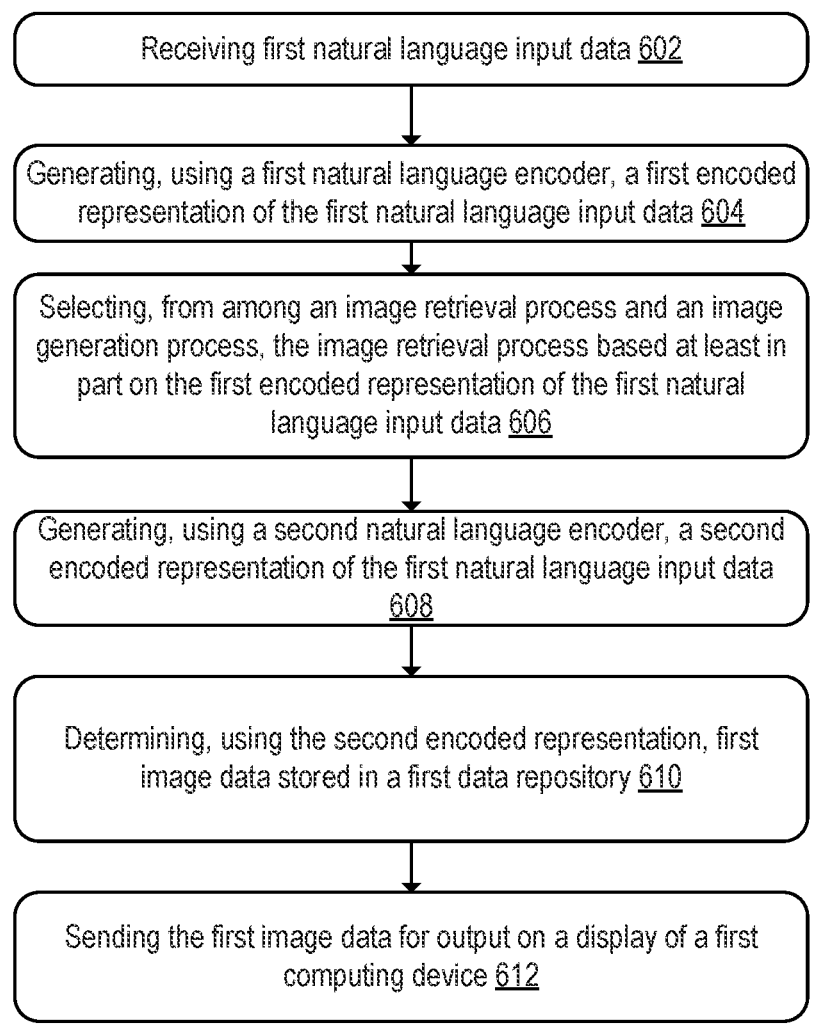
FIG. 6 illustrates an example process for query evaluation for image retrieval and conditional image generation, in accordance with various aspects of the present disclosure.

FIG. 6 illustrates an example process 600 for query evaluation for image retrieval and conditional image generation, in accordance with various aspects of the present disclosure. The process 600 of FIG. 6 may be executed by one or more computing devices. The actions of process 600 may represent a series of instructions comprising computer-readable machine code executable by a processing unit of a computing device. In various examples, the computer-readable machine code may be comprised of instructions selected from a native instruction set of the computing device and/or an operating system of the computing device. Various actions in process 600 may be described above with reference to elements of FIGS. 1-5. Although shown in a particular order, the steps of process 600 may instead be performed in a different order. Additionally, various steps may be performed in parallel in various implementations. Further, some steps may be omitted and/or other steps may be added in accordance with the query evaluation for image retrieval and conditional image generation techniques described herein.

Process 600 may begin at action 602, at which first natural language input data may be received. For example, an input query may be received, which may be a user request and/or a natural language processing system response to the user request. In various examples, the first natural language input may include contextual information such as device ID data, device state data, previous turns of dialog and/or system actions taken, account information, etc.

Processing may continue at action 604, at which a first natural language encoder may be used to generate a first encoded representation of the first natural language input data. For example, a transformer-based natural language encoder (e.g., BERT) and/or another natural language encoder (e.g., Word-2-vec, etc.) may be used to generate a first encoded representation (e.g., a multidimensional vector) representing the first natural language input data. The first natural language encoder may be, for example, NLP encoder 304 described above in reference to FIG. 3.

Processing may continue at action 606, at which an image retrieval process may be selected from among the image retrieval process and an image generation process based on the first encoded representation of the first natural language input data. For example, based on evaluation of the input query, a determination may be made whether image retrieval or image generation is more appropriate for the input query. For example, the query understanding and enrichment component 112 may use various neural network-based classifiers (such as those described above in reference to FIG. 3) to understand semantic information of the first natural language input data. The query understanding and enrichment component 112 may employ logic to determine, based on the output of its various classifiers, whether image generation 134, image retrieval 132, neither, or both should be employed. In the example of FIG. 6, image retrieval 132 may be selected. This may be because there is an entity mentioned in the first natural language input data and/or because the first natural language input data is classified as non-creative (and/or appropriate for retrieval). In various examples, if an entity is detected in the first natural language input data by entity classifier 120, the query understanding and enrichment component 112 may use the entity-based retrieval workflow to retrieve an image related to the entity from graph/entity image index 142. Conversely, if no entity is mentioned in the first natural language input data, the query understanding and enrichment component 112 may use the text-based image retrieval workflow to retrieve an image from image index 140. It should be noted that for other natural language inputs, the image generation 134 task may be selected for image generation (either with image retrieval or alone). In cases where both image generation 134 and image retrieval 132 are performed, the tasks may be performed in parallel to reduce latency (from the perspective of the device on which the image(s) are output). Additionally, in some cases, the query understanding and enrichment component 112 may output retrieved images over generated images (to the extent that both generated and retrieved images exist for a given input query) in order mitigate risk of generative model hallucination and/or misrepresentation.

Processing may continue at action 608, at which a second natural language encoder may generate a second encoded representation of the first natural language input data. In various examples, the second natural language encoder may be an encoder (e.g., an encoder of an autoencoder, a transformer-based encoder, etc.) that is trained for image search (e.g., text-based image retrieval). In some cases, the first natural language input data may be rewritten (e.g., by a LM) prior to encoding it for image retrieval. Additionally, in some cases, a temporal encoder may encode temporal context if the temporal relevance classifier 116 determines that the first natural language input data includes temporal information. In other cases, the second natural language encoder may separately encode temporal information for the image retrieval 132 task. In still other examples, if it is determined that particular input query 110 is relevant to a particular time period, there may be a heuristic that filters retrieved images according to images related to the particular time period. The particular time period to which images relate may be stored in metadata associated with the images. This relevant time period may be an input signal to image re-ranking/guardrails 136. For example, if the user asks the question "Who won the match between [Team A] and [Team B] last week" the retrieved images may be filtered such that the images relevant to a game between the two teams that occurred within the last week may be ranked higher relative to images of the two teams from previous or subsequent time periods.

Processing may continue at action 610, at which the second encoded representation (e.g., a multidimensional vector) may be used to determine first image data stored in a first data repository. For example, the top K image embeddings (in terms of highest similarity to the second encoded representation—a text embedding) may be determined using a desired vector similarity metric (e.g., cosine similarity, cosine distance, Euclidean distance). The image data represented by these top K image embeddings may be retrieved, ranked (e.g., in terms of recency, highest relevance, highest vector similarity metric, highest temporal relevance, using guardrails, etc.). Processing may continue to action 612, at which the first image data may be sent for output on a display of a first computing device. While action 612 describes output of first image data, multiple images may be output, if desired, depending on the desired implementation.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a component, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A computer-implemented method comprising:
receiving first natural language input data comprising a first natural language processing system response to a first user input;
generating, using a first natural language encoder, a first encoded representation of the first natural language input data;
determining, using named entity recognition processing, that the first encoded representation is associated with a mention of an entity;
determining, from among a query embedding-based image retrieval process and an image generation process, that the query embedding-based image retrieval process is more appropriate for responding to the first user input based at least in part on the determining that the first encoded representation of the first natural language input data is associated with the mention of the entity;
generating, using a second natural language encoder, a second encoded representation of the first natural language input data;
determining, by searching an embedding space using the second encoded representation, first embedding data representing first image data based at least in part on a distance in the embedding space between the second encoded representation and the first embedding data; and
sending the first image data for output on a display of a first computing device associated with the first user input.

2. The computer-implemented method of claim 1, further comprising:
generating a first graph query comprising first entity data identifying the entity;
querying a first graph-based data structure associated with a plurality of recognized entities using the first graph query;
receiving, in response to the querying the first graph-based data structure, second image data associated with the first entity; and
selecting, from among the first image data and the second image data, the first image data for output on the display of the first computing device.

3. The computer-implemented method of claim 1, further comprising:
receiving second natural language input data comprising a second natural language processing system response to a second user input;
generating, using the first natural language encoder, a third encoded representation of the second natural language input data;
determining, using named entity recognition processing, that the third encoded representation does not reference a recognized entity;
determining, using a first machine learning classifier, that the second natural language input data is classified as a creative natural language input;
determining, from among the query embedding-based image retrieval process and the image generation process, that the image generation process is more appropriate for responding to the second user input based at least in part on the determining that the second natural language input data is classified as the creative natural language input;
generating, using a latent diffusion model and the second natural language input data, second image data; and
sending the second image data for output on a display of a second computing device associated with the second user input.

4. The computer-implemented method of claim 1, further comprising:
determining, using a first machine learning classifier, that the first natural language input data includes temporal information;
generating, using the second natural language encoder, the second encoded representation of the first natural language input data comprising at least one temporal feature representing the temporal information; and
determining the first embedding data based at least in part on the at least one temporal feature, wherein the first image data is associated with the temporal information.

5. A method comprising:
receiving first natural language input data;
generating, using a first natural language encoder, a first encoded representation of the first natural language input data;
determining, from among an image retrieval process and an image generation process, that the image retrieval process is appropriate for the first natural language input data based at least in part on the first encoded representation of the first natural language input data;
generating, using a second natural language encoder, a second encoded representation of the first natural language input data;
determining, using the second encoded representation, first image data stored in a first data repository; and
sending the first image data for output on a display of a first computing device.

6. The method of claim 5, further comprising:
determining, using named entity recognition processing, that the first encoded representation is associated with a first recognized entity; and
selecting the image retrieval process instead of the image generation process based at least in part on the first encoded representation of the first natural language input data being associated with the first recognized entity.

7. The method of claim 5, further comprising:
receiving second natural language input data;
generating, using the first natural language encoder, a second encoded representation of the second natural language input data;
determining, using a first machine learning classifier, that the second natural language input data is classified as a creative input;
selecting, from among the image retrieval process and the image generation process, the image generation process based at least in part on the second natural language input data being classified as the creative input;
generating, using a latent diffusion model and the second natural language input data, second image data; and
sending the second image data for output on a display of a second computing device.

8. The method of claim 7, further comprising:
receiving a first training data instance comprising a first natural language query labeled with first label data indicating that the first natural language query is classified as the creative input;
generating, using the first natural language encoder, a third encoded representation of the first natural language query;
generating, by the first machine learning classifier using the first natural language query, first prediction data;

determining first error data representing a difference between the first prediction data and the first label data; and determining an updated set of parameters for at least one of the first natural language encoder or the first machine learning classifier based on the first error data.

9. The method of claim 5, further comprising:

determining, using a first machine learning classifier, that the first natural language input data includes temporal information;

generating, using the second natural language encoder, the second encoded representation of the first natural language input data comprising at least one temporal feature representing the temporal information; and determining the first image data based at least in part on the at least one temporal feature, wherein the first image data is associated with the temporal information.

10. The method of claim 5, further comprising:

receiving second natural language input data;

generating, using the first natural language encoder, a second encoded representation of the second natural language input data; and determining, using a first machine learning classifier using the second encoded representation, first output data indicating that no image is to be retrieved or generated for the second natural language input data.

11. The method of claim 5, further comprising:

identifying a first recognized entity represented in the first natural language input data;

generating a first graph query comprising first entity data identifying the first recognized entity;

querying a first graph-based data structure associated with a plurality of recognized entities using the first graph query;

receiving, in response to the querying the first graph-based data structure, second image data associated with the first recognized entity; and selecting, from among the first image data and the second image data, the first image data for output on the display of the first computing device.

12. The method of claim 5, further comprising:

sending the first image data and second image data to a compositional image generator; and generating, by the compositional image generator a compositional image using the first image data and the second image data.

13. A system comprising:

at least one processor; and non-transitory computer-readable memory storing instructions that, when executed by the at least one processor, are effective to:

receive first natural language input data;

generate, using a first natural language encoder, a first encoded representation of the first natural language input data;

determine, from among an image retrieval process and an image generation process, that the image retrieval process is appropriate for the first natural language input data based at least in part on the first encoded representation of the first natural language input data;

generate, using a second natural language encoder, a second encoded representation of the first natural language input data;

determine, using the second encoded representation, first image data stored in a first data repository; and send the first image data for output on a display of a first computing device.

14. The system of claim 13, the non-transitory computer-readable memory storing further instructions that, when executed by the at least one processor, are further effective to:

determine, using named entity recognition processing, that the first encoded representation is associated with a first recognized entity; and select the image retrieval process instead of the image generation process based at least in part on the first encoded representation of the first natural language input data being associated with the first recognized entity.

15. The system of claim 13, the non-transitory computer-readable memory storing further instructions that, when executed by the at least one processor, are further effective to:

receive second natural language input data;

generate, using the first natural language encoder, a second encoded representation of the second natural language input data;

determine, using a first machine learning classifier, that the second natural language input data is classified as a creative input;

select, from among the image retrieval process and the image generation process, the image generation process based at least in part on the second natural language input data being classified as the creative input;

generate, using a latent diffusion model and the second natural language input data, second image data; and send the second image data for output on a display of a second computing device.

16. The system of claim 15, the non-transitory computer-readable memory storing further instructions that, when executed by the at least one processor, are further effective to:

receive a first training data instance comprising a first natural language query labeled with first label data indicating that the first natural language query is classified as the creative input;

generate, using the first natural language encoder, a third encoded representation of the first natural language query;

generate, by the first machine learning classifier using the first natural language query, first prediction data;

determine first error data representing a difference between the first prediction data and the first label data; and determine an updated set of parameters for at least one of the first natural language encoder or the first machine learning classifier based on the first error data.

17. The system of claim 13, the non-transitory computer-readable memory storing further instructions that, when executed by the at least one processor, are further effective to:

determine, using a first machine learning classifier, that the first natural language input data includes temporal information;

generate, using the second natural language encoder, the second encoded representation of the first natural language input data comprising at least one temporal feature representing the temporal information; and determine the first image data based at least in part on the at least one temporal feature, wherein the first image data is associated with the temporal information.

18. The system of claim 13, the non-transitory computer-readable memory storing further instructions that, when executed by the at least one processor, are further effective to:

receive second natural language input data;
generate, using the first natural language encoder, a second encoded representation of the second natural language input data; and
determine, using a first machine learning classifier using the second encoded representation, first output data indicating that no image is to be retrieved or generated for the second natural language input data.

19. The system of claim 13, the non-transitory computer-readable memory storing further instructions that, when executed by the at least one processor, are further effective to:

identify a first recognized entity represented in the first natural language input data;
generate a first graph query comprising first entity data identifying the first recognized entity;
query a first graph-based data structure associated with a plurality of recognized entities using the first graph query;
receive, in response to the querying the first graph-based data structure, second image data associated with the first recognized entity; and
select, from among the first image data and the second image data, the first image data for output on the display of the first computing device.

20. The system of claim 13, the non-transitory computer-readable memory storing further instructions that, when executed by the at least one processor, are further effective to:

generate, using the first natural language input data and a latent diffusion model, second image data; and
select, from among the first image data and the second image data, the first image data for output on the display of the first computing device.

* * * * *